(No Model.)
J. F. GLIDDEN.
HORSE HAY RAKE.
No. 418,008. Patented Dec. 24, 1889.
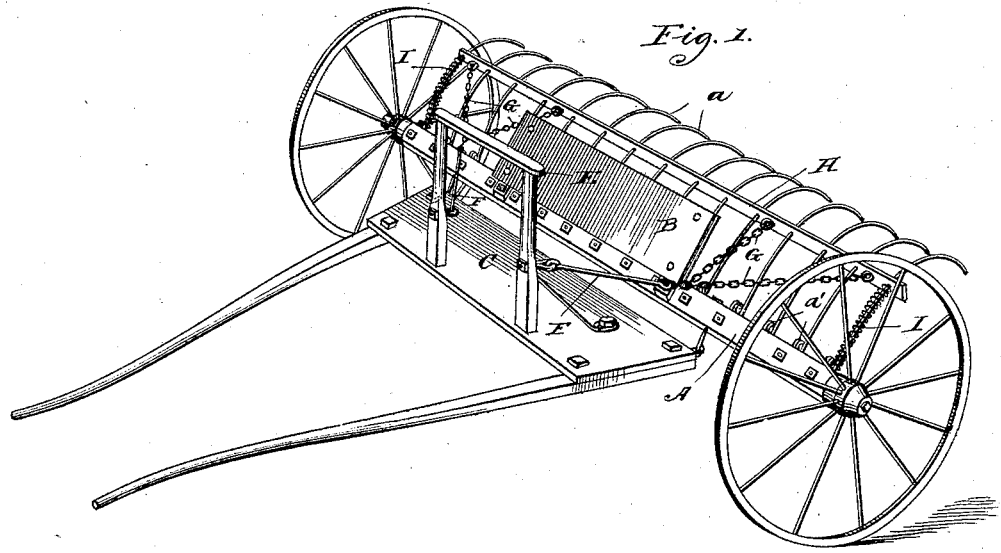
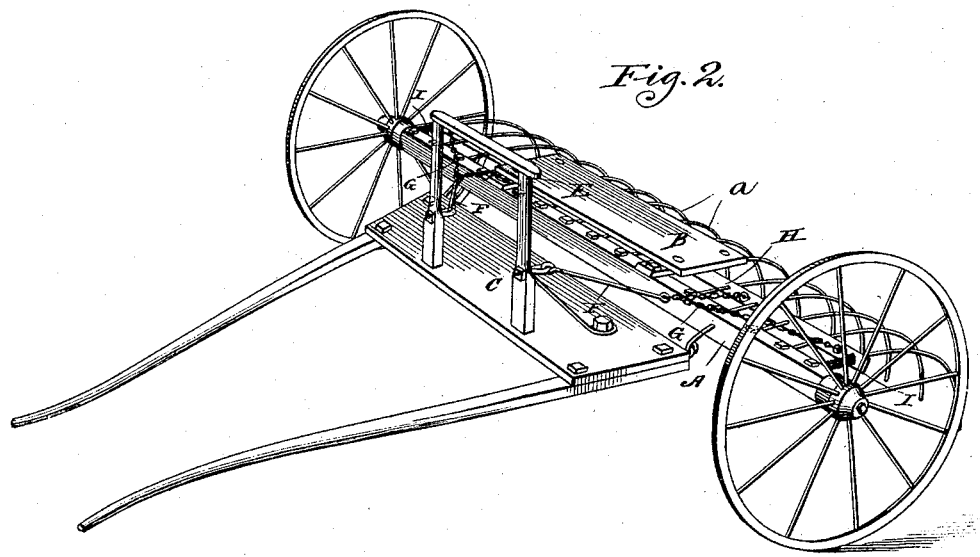
Witnesses
S. F. Mann
C. C. Linthicum
Inventor,
Joseph F. Glidden
By Offield & Towle Atty's
N. PETERS. Photo-Lithographer, Washington, D. C.

UNITED STATES PATENT OFFICE.

JOSEPH F. GLIDDEN, OF DE KALB, ILLINOIS.

HORSE HAY-RAKE.

SPECIFICATION forming part of Letters Patent No. 418,008, dated December 24, 1889.

Application filed May 2, 1889. Serial No. 309,336. (No model.)

*To all whom it may concern:*

Be it known that I, JOSEPH F. GLIDDEN, a citizen of the United States, residing at De Kalb, Illinois, have invented certain new and useful Improvements in Horse Hay-Rakes, of which the following is a specification.

My invention relates to that class of horse hay-rakes in which the rake-teeth are connected at their upper ends to a head which may also be the axle, and which teeth are curved rearwardly and downwardly so as to trail along the ground to gather the hay, the latter being discharged by rocking the rake-head on its longitudinal axis. Various devices have been resorted to for effecting the rocking of the rake-head to discharge the hay, the most common being a tilting lever, which is operated by the driver, whose seat is ordinarily secured to the thills.

A common objection to horse hay-rakes as now constructed is that the hay gathered by the teeth becomes entangled by forcing itself between the teeth, whereby it is very difficult to properly discharge it. To overcome this difficulty a bar has been provided, which is flexibly connected to the rake-head and adapted to rest upon the upper sides of the teeth, and in some cases the teeth have been passed through this bar.

It is the object of my invention to provide means whereby clogging of the hay in the teeth is prevented and the hay is easily discharged.

Another feature of my invention relates to the provision of means whereby the downward movement of the teeth may be limited.

In the accompanying drawings, Figure 1 is a perspective view of a hay-rake embodying my improvements, the rake-teeth being in their elevated position and the discharge-bar at the outer point of its movement; and Fig. 2 is a similar view showing the teeth in position to trail upon the ground to gather the hay.

Referring to said drawings, the series of teeth *a* are shown connected to the axle A, said teeth having one or more coils *a'* at their ends next to the axle, as in the usual construction.

B is a transverse platform, which is mounted over the axle; and C is a platform for the driver, which is secured to the thills. The usual seat may be provided on the platform B, if desired, and the platform C may have the frame E erected thereon to serve as a guard between the driver and the horse, and the posts whereof afford convenient means for securing links F, the outer ends of which are attached to a chain or chains G, which are secured to the adjustment-bar H, the latter, as shown, having holes through which the teeth *a* protrude.

I are spiral springs, which may surround the teeth *a*, and which are seated at one end against the axle A and at the other against the discharge-bar H. The thills are pivotally connected to the axle in the usual manner.

In operation, when it is desired to gather the hay, the driver puts his weight upon the platform B, which causes the teeth to touch the ground, their downward movement being limited by the connections F G, and the springs I being compressed by said movement. When the teeth have gathered a sufficient amount of hay to form the windrow, the driver brings his weight to bear upon the platform C, thereby depressing said platform and tilting the teeth upward, thus releasing the connections F G, and thereby permitting the spring to thrust the discharge-bar away from the axle and clearing the teeth of the hay. This discharge-bar also prevents the hay from forcing itself between the teeth at their upper ends, and thus serves to prevent clogging of the hay in the operation of raking, as well as facilitating its discharge.

My invention is not limited to specific forms or arrangements of parts, but is capable of being embodied in equivalent forms and combinations.

I claim—

1. In a hay rake, the combination, with the rake-head and thills pivotally connected together, of a discharge-bar movable along the rake-teeth, outwardly-forcing springs connected with the rake-head and the discharge-bar, respectively, and a flexible connection between the discharge-bar and the thills, substantially as described.

2. In a hay-rake, the combination, with the rake-head and thills pivotally connected together and each provided with a platform whereon the driver may stand, of a spring-controlled discharge-bar movable along the rake-teeth, outwardly-forcing springs connected to the discharge-bar and head, respectively, and a flexible connection between the discharge-bar and the thills, substantially as described.

J. F. GLIDDEN.

Witnesses:
C. K. OFFIELD,
H. S. SOULE.